United States Patent [19]

Yoshioka et al.

[11] 4,281,209
[45] Jul. 28, 1981

[54] GAS-INSULATED ELECTRICAL APPARATUS WITH DIELECTRIC PARTICLE TRAPPING BARRIERS

[75] Inventors: Akiyoshi Yoshioka, Itami; Yoshikazu Shibuya, A; Ioichiro Nakanishi, Osaka, all of Japan

[73] Assignee: Mitsubishi Denki Kabushiki Kaisha, Tokyo, Japan

[21] Appl. No.: 114,005

[22] Filed: Jan. 21, 1980

[30] Foreign Application Priority Data

Jan. 25, 1979 [JP] Japan .................................. 54-8074

[51] Int. Cl.³ .......................... H01B 9/04; H02G 5/06
[52] U.S. Cl. .................................. 174/14 R; 174/28; 174/100; 174/211
[58] Field of Search .................. 174/14 R, 16 B, 28, 174/99 R, 99 B, 100, 211

[56] References Cited

U.S. PATENT DOCUMENTS

| 3,223,772 | 12/1965 | Moening | 174/211 X |
| 3,814,879 | 6/1974 | Cookson et al. | 174/14 R X |
| 3,856,978 | 12/1974 | Sletten et al. | 174/14 R |

FOREIGN PATENT DOCUMENTS

| 822676 | 9/1937 | France | 174/28 |
| 130295 | 3/1978 | German Democratic Rep. | 174/14 R |
| 131319 | 6/1978 | German Democratic Rep. | 174/28 |
| 50-138384 | 4/1975 | Japan | 174/14 R |
| 544034 | 4/1977 | U.S.S.R. | 174/14 R |

*Primary Examiner*—Laramie E. Askin
*Attorney, Agent, or Firm*—M. S. Yatsko

[57] ABSTRACT

A grounded hollow cylindrical housing filled with $SF_6$ encircles coaxially a rod-shaped electric conductor through a plurality of spaced, electrically insulating spacers. With the housing disposed horizontally, two spaced, hollow frustoconical dielectric members are connected to the inner surface of the housing adjacent to either surface of each spacer to overlap the latter. With the housing disposed vertically, a disc-shaped dielectric member fixedly extends through the conductor to be adjacent and overlap each spacer. Further, an annular dielectric member may be connected to the inner surface of the housing between the disc-shaped dielectric member and the spacer. The dielectric member is preferably of a poly-tetrafluoroethylene.

7 Claims, 4 Drawing Figures

4,281,209

GAS-INSULATED ELECTRICAL APPARATUS WITH DIELECTRIC PARTICLE TRAPPING BARRIERS

BACKGROUND OF THE INVENTION

This invention relates to a gas insulated electrical apparatus including, as an electrically insulating medium, gaseous sulfur hexafluoride ($SF_6$) or the like, and more particularly to trap means disposed in such an apparatus to trap foreign particles floating within the apparatus to prevent the particles from sticking to the surface of electrically insulating spacers for supporting a high voltage rod-shaped electric conductor involved.

Gas insulated electrical apparatus comprise generally the high voltage rod-shaped electric conductor and the grounded metallic housing in the form of a hollow cylinder for encircling coaxially the electric conductor through a plurality of supporting structures disposed at predetermined intervals in the grounded metallic housing. A conventional supporting structure has comprised a disc-shaped electrically insulating spacer having the high voltage electric conductor horizontally disposed and fixedly extending through the center thereof to be perpendicular to the surface thereof, a grounded metallic tubular member disposed in coaxial relationship within the grounded cylindrical housing to form an annular space therebetween and having an inner cylindrical surface to which the outer peripheral edge of the electrically insulating spacer is fixedly secured, and a supporting annulus connected to the cylindrical housing to support fixedly the grounded metallic tubular member to form an annular trap space. The tubular member has been provided on the lower portion of its wall with a plurality of parallel slits running substantially perpendicularly to the longitudinal axis thereof.

Floating particles of an electrically conductive foreign matter or matters are trapped in the trap space through the slits on the grounded tubular member to be prevented from sticking to the surface of the supporting spacer thereby to decrease the dielectric strength of the apparatus. However, the trapped foreign particles tend to be accumulated and piled up on those portions of the inner wall surface of the cylindrical housing adjacent to both ends of the tubular member. Therefore, gas insulated electrical apparatus such as described above have been disadvantageous in that, upon an abnormal voltage surging to the electric conductor, the foreign particles thus accumulated are again blown out. Also, such apparatus have been disadvantageous in that the cylindrical housing is required to increase in diameter because the trap space is partly defined by the grounded metallic tubular member so that the required electrically insulating space narrows by the dimension of the annular trap space.

Accordingly, it is a general object of the present invention to eliminate the disadvantages of the prior art practice as described above.

It is an object of the present invention to provide a gas insulated electrical apparatus having an improved structure effective for preventing floating particles of a foreign matter or matters within the apparatus from sticking to the surface of electrically insulating spacers for supporting a high voltage electric conductor involved.

SUMMARY OF THE INVENTION

The present invention provides a gas insulated electrical apparatus comprising a high voltage electric conductor, a grounded metallic housing in the form of a hollow cylinder connected to ground and filled with an amount of an electrically insulating gas high in dielectric strength, a plurality of electrically insulating spacers disposed at predetermined intervals in the metallic housing and supporting the high voltage electric conductor, and at least one dielectric member disposed adjacent to each of the electrically insulating spacers within the metallic housing and contacting at least one of the surface of the high voltage electric conductor and the inner surface of the metallic housing, through a contact surface thereof, the dielectric member at least radially protruding from the contact surface.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENTS

Figure 1:
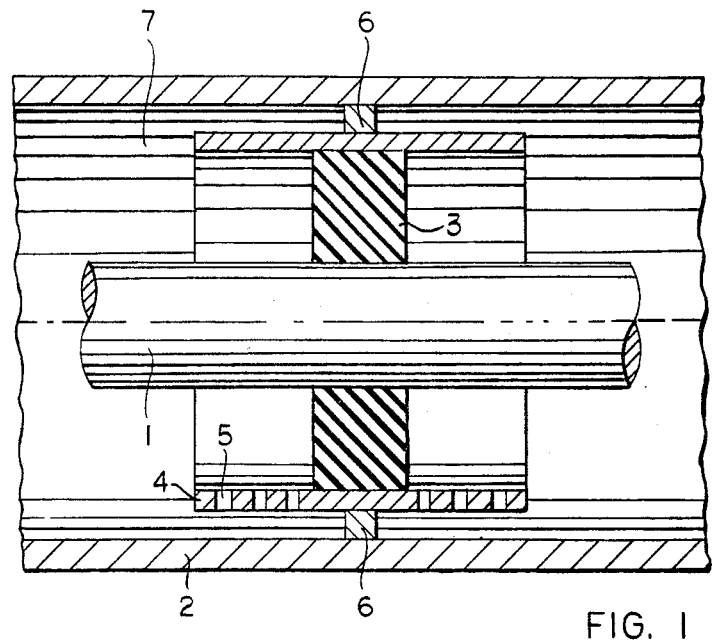
FIG. 1 is a fragmental longitudinal sectional view, partly in plan, of a gas insulated electric apparatus including conventional trap means.

Referring now of FIG. 1 of the drawings, there is illustrated a gas insulated electric apparatus including conventional trap means. The arrangement illustrated comprises a high voltage electric conductor 1 in the form of a rod disposed coaxially within a grounded metallic housing 2 in the form of a hollow cylinder through a plurality of supporting structures disposed at predetermined intervals in the hollow cylindrical housing 1 although only one of the supporting structures is shown for purposes of illustration. Each of the supporting structures includes a disc-shaped, electrically insulating spacer 3 having the electric conductor 1 fixedly extending through the center thereof to be perpendicular to the surface thereof and a grounded metallic tubular member 4 of a relatively short length disposed in coaxial relationship within the hollow cylindrical housing 2 to form an annular space therebetween. The electrically insulating spacer 3 is fixedly secured at the outer peripheral edge to the middle portion of the inner surface of the tubular member 4. Then the tubular member 4 is provided on the lower portion as viewed in FIG. 1 of that section of the wall thereof located on either side of the electrically insulating spacer 3 with spaced, parallel slits 5 extending perpendicularly to the longitudinal axis of the tubular member 4 and equidistantly from the lowermost portion of the wall thereof. A supporting metallic annulus 6 is fixedly secured to the inner wall surface of the hollow cylindrical housing at its predetermined position and the tubular member 4 is rigidly fitted into the supporting annulus 6 so that the electrically insulating spacer 3 centers the supporting annulus 6 radially of the tubular member 4 and that an annular space is formed between the tubular member 4 and the cylindrical housing 2. The annular space forms a trap space or means for floating particles of electrically conductive foreign matter or matters which may exist within the hollow cylindrical housing 2.

Then the hollow cylindrical housing 2 is filled with an amount of an electrically insulating gas 7 high in dielectric strength such as gaseous sulfur hexafluoride ($SF_6$) under a suitable pressure.

In general, particles of the electrically conductive foreign matter or matters may enter gas insulated electric apparatus such as shown in FIG. 1 for some reasons. Alternatively, such foreign particles may be formed in gas insulated electric apparatus after the installation thereof. Under these circumstances, the electric conductor 1 put at a high voltage forms an electric fluid between the same and the cylindrical housing 2 to exert on the foreign particles floating in the housing 2 a buoyancy resulting from an electrostatic force as determined by a field strength thereof. If this buoyancy exceeds the gravity acting on the floating foreign particles, then the particles float upwardly until they may stick to the surface of the adjacent spacer 3.

While the foreign particles are floating within the housing, they scarcely affect the dielectric strength of the gas insulated electrical apparatus, but when such particles become stuck to the surface of the supporting electrically insulating spacers, creeping flashover is apt to occur. Alternatively, the surface of the spacers is deteriorated due to corona discharge. This has resulted in a major cause for decreasing the dielectric strength of gas insulated electrical apparatus.

Accordingly, it is a common practice to dispose in gas insulated electrical apparatus the trap means for trapping foreign particles floating therein. In the arrangement of FIG. 1 including the conventional trap means, the tubular metallic member 4 forms an intermediate electrode between the high voltage conductor 1 and the grounded cylindrical housing 2 and is maintained substantially at the same potential as the cylindrical housing connected to ground. Once the foreign particles floating within the grounded housing 2 have been entered into the trap space between the tubular member 4 or the intermediate electrode and the adjacent portion of the grounded housing 2 through the slits 5 and the interior of the tubular member 4, the entered particles do not again fly out from the trap space because the electric field therein is low.

However, the floating foreign particles are not uniformly trapped in the trap space. Actually, the foreign particles tend to be accumulated and piled up on those portions of the inner cylindrical surface of the housing 2 adjacent to both ends of the tubular member 4. This has resulted in the disadvantage that, upon an abnormal voltage surging to the electric conductor 1, the foreign particles trapped once in the trap space again float therefrom. Also, since the trap space is partly defined by the grounded tubular member 4, the resulting electrically insulating space becomes narrow by the dimension of the trap space. This has resulted in the disadvantage that the housing must increase in diameter.

The present invention contemplates to eliminate the disadvantages of the prior art practice as described above and provides a gas insulated electric apparatus having a structure that a dielectric member in the form of an annulus is disposed to contact at least one of a high voltage electric conductor and a grounded metallic housing encircling the electric conductor thereby to prevent effectively foreign particles within the apparatus from sticking to the surface of electrically insulating spacers for supporting the electric conductor.

Figure 2:
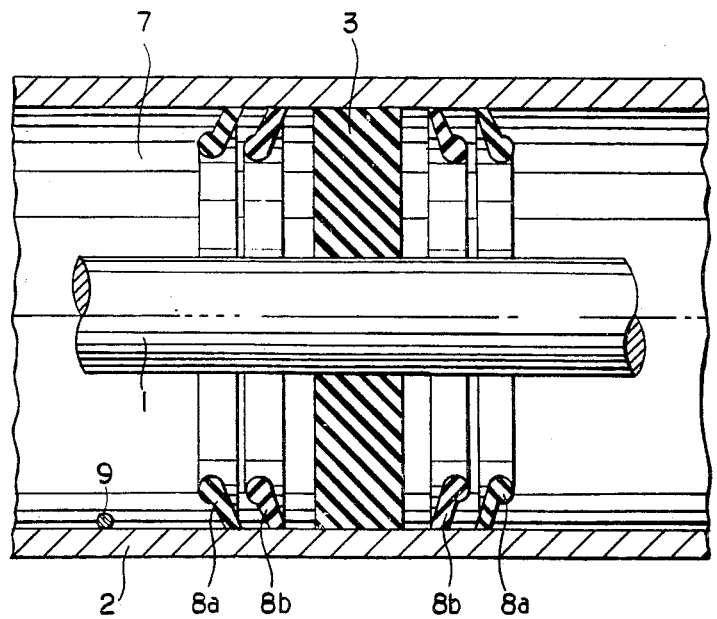
FIG. 2 is a fragmental longitudinal sectional view, partly in plan, of a gas insulated electric apparatus including one embodiment according to the trap device of the present invention.

Referring now to FIG. 2, there is illustrated one embodiment according to the gas insulated electric apparatus of the present invention. The arrangement illustrated comprises a high voltage electric conductor 1 similar to that shown in FIG. 1 disposed in coaxial relationship in a grounded, hollow cylindrical housing 2 also similar to that shown in FIG. 1 and disposed horizontally. A plurality of disc-shaped, electrically insulating spacers 3 are disposed at predetermined intervals in the hollow cylindrical housing 2 by having outer peripheral edges directly fixed to the inner surface of the housing 2, and the electric conductor 1 fixedly extends through the centers of the spacers 3 to be perpendicular to the surface thereof. Then the housing 2 is filled with an amount of an electrically insulating gas 7 such as gaseous sulfur hexafluoride ($SF_6$) as in the arrangement of FIG. 1.

Also, FIG. 2 shows only one of the spacers 3 for purposes of illustration.

According to the present invention, a pair of trap annuli 8a and 8b formed of any suitable dielectric material are disposed on either side of the associated spacer 3 to be spaced from each other and from the adjacent surface of that spacer 3. Each of the trap annuli 8a or 8b has a cross section in the form of a hollow truncated cone having a smaller diameter end made round and a larger diameter end provided on the outer periphery with a cylindrical surface suitable to contact the adjacent portion of the inner cylindrical surface of the housing 2. Therefore, the cylindrical surface forms a contact surface through which the trap annulus 8a or 8b is fixed by being secured to the inner surface of the hollow cylindrical housing 2, the smaller diameter end lying remote from the adjacent surface of the spacer 3. Accordingly, the pair of trap annuli 8a and 8b are disposed to doubly overlap in spaced relationship the adjacent surface of the associated spacer 3, by extending from the contact surfaces thereof radially inward and axially of the housing 2.

The operation of the arrangement shown in FIG. 2 will now be described. An alternating voltage is applied to the electric conductor 1 to establish an AC electric field around the electric conductor 1 within the hollow cylindrical housing 2 connected to ground. Accordingly, fine particles of a foreign matter or matters located principally on the inner cylindrical surface of the housing 2 such as shown by 9 in FIG. 2 are electrically charged to float upwardly. The foreign particles thus charged and floating are initiated to vibrate in the vicinity of the inner cylindrical surface of the housing 2 principally radially of the longitudinal axis of the housing 2 and to be moved randomly along that longitudinal axis to some extents. During the movement some of the charged foreign particles contact the outer trap annulus 8a to induce an image charge on the surface of the latter. Under these circumstances the charged foreign particles are trapped by the surface of the trap annulus 8a by means of the action of an attraction developed between the particles and annulus 8a. As a result, the charged foreign particles cannot easily fly across the outer trap annulus 8a to enter a region very close to the adjacent surface of the spacer 3. Even though the charged foreign particles would fly across the outer trap annulus 8a, they are substantially prevented from reaching the adjacent surface of the spacer 3 by means of the inner trap annulus 8b having an image charge similarly induced on the surface thereof. In other words, the charged foreign particles are permitted to reach the surface of the electrically insulating spacer 3 with a very small probability.

The dielectric material of the trap annuli 8a and 8b is desirable to be low in leakage resistance and high in dielectric constant. It has been found that the use of poly-tetrafluoroethylene such as commercially available under "Teflon" (trademark) gives the satisfactory result.

Figure 3:
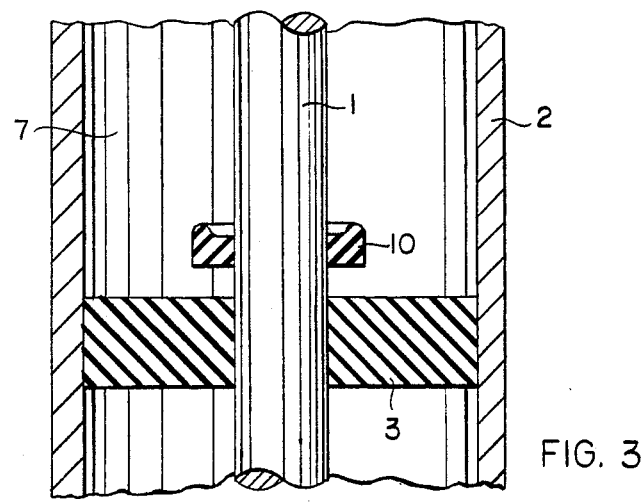
FIG. 3 is a fragmental longitudinal sectional view, partly in elevation of a modification of the present invention.

FIG. 3 shows a modification of the present invention applied to a gas insulated electric apparatus vertically disposed. The arrangement illustrated is different from that shown in FIG. 2 only in that in FIG. 3, an annular trap disc 10 is substituted for the two pairs of dielectric trap annuli 8a and 8b shown in FIG. 2. Therefore, in FIG. 3 like reference numerals designate the components identical to those shown in FIG. 2.

More specifically, the annular trap disc 10 is formed of the dielectric material as described above and disposed in spaced parallel relationship with each of the electrically insulating spacers 3 within the hollow cylindrical housing 2, while the high voltage electric conductor 1 fixedly extends through the central aperture thereof. The trap disc 10 is provided on the upper surface with a circular recess concentric with the same, and serving to accumulate foreign particles therein.

With gas insulated electric apparatus disposed vertically, electrically conductive foreign particles fall within the housing axially thereof by means of the action of gravity. On the other hand, such particles vibrate radially of the housing due to an AC electric field established within the latter. In general, the AC electric field has its strength higher adjacent to the centrally located electric conductor than adjacent to the inner surface of the cylindrical housing. In addition, upon the electrically conductive foreign particles falling upon the electrically insulating spacer, it is usual that such particles become stuck to the surface of the electric conductor and the inner surface of the housing.

Accordingly, the electrically conductive foreign particles are apt to be more accumulated on the central portion of the spacer than on the peripheral portion thereof. This means that the distribution of such particles on the central portion of the spacer imparts a great influence to the dielectric breakdown as compared with that on the peripheral portion thereof.

In order to avoid this objection, the arrangement of FIG. 3 includes the trap disc 10 overlapping in spaced relationship the associated spacer 3 to prevent the electrically conductive foreign particles from tending to be accumulated on the central portion of the spacer.

Figure 4:
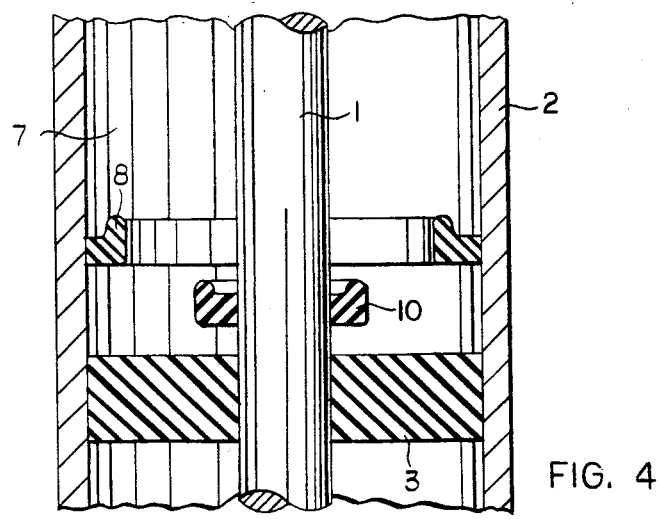
FIG. 4 is a view similar to FIG. 3 but illustrating another modification of the present invention.

The arrangement illustrated in FIG. 4 is different from that shown in FIG. 3 only in that in FIG. 4 another trap annulus is additionally disposed in the housing. As shown in FIG. 4, a trap annulus 8 is disposed above the trap disc 10 by having its outer peripheral surface connected to the adjacent portion of the housing 2. The trap annulus 8 has an inner peripheral surface axially longer than the outer peripheral surface to form a step on the upper surface as viewed in FIG. 4 of the annulus 8, that is to say, that surface thereof remote from the spacer 3.

The trap annulus 8 forms a trap region in the vicinity of the inner surface of the housing to prevent the foreign particles from being accumulated on the peripheral portion of the associated spacer 3. That is, it increases a region in which the foreign particles are trapped.

From the foregoing it is seen that the trap disc 10 shown in FIG. 3 or 4 includes a contact surface formed of the wall of the central aperture and protrudes radially outward from the contact surface and that the trap annulus 8 shown in FIG. 4 has the outer peripheral surface forming a contact surface and protrudes radially inward from the contact surface.

In the arrangements shown in FIGS. 3 and 4 respectively, the trap region can be increased by lengthening that portion of the trap disc 10 protruding radially outward from the contact surface thereof. However, this lengthening of the trap disc 10 is attended with a decrease in insulation distance between the inner surface of the housing 2 and the foreign particles trapped on the outer peripheral portion of the trap disc 10, or the outer periphery thereof. This may result in the dielectric breakdown.

Accordingly, it is required to design and construct the trap annulus and disc 8 and 10 respectively on a compromise between an increase in trapping function and the ensuring of the insulation distance.

The present invention has several advantages because the trap means is formed of a dielectric material. For example, foreign particles can be trapped by the trap means of a simple structure to be prevented from reaching the electrically insulating spacers without disturbing an electric field established in the gas insulated electric apparatus or the dielectric strength thereof. This results in an increase in reliability.

While the present invention has been illustrated and described in conjunction with a few preferred embodiments thereof, it is to be understood that numerous changes and modifications may be resorted to without departing from the spirit and scope of the present invention. For example, while the trap means terminate at peripheral edges in the form of circular sections, it is to be understood that such an edge may include a plurality of radial notches arranged to be symmetric with respect to the center of the trap means to form a plurality of radial protrusions on the edge.

What we claim is:

1. A gas insulated electrical apparatus comprising a high voltage electric conductor, a grounded metallic housing in the form of a hollow cylinder connected to ground and filled with an amount of an electrically insulating gas high in dielectric strength, a plurality of disc-shaped electrically insulating spacers disposed at predetermined intervals in said metallic housing and supporting said high voltage electric conductor, and at least one separate dielectric member disposed adjacent to and spaced-apart from each of said electrically insulating spacers each dielectric member having a cross section in the form of a hollow truncated cone having larger and smaller diameter ends with the larger diameter end contacting the inner surface of said metallic housing, each dielectric member extending radially inwardly toward and spaced apart from said electric conductor and axially outwardly away from its adjacent insulating spacer.

2. A gas insulated electrical apparatus as claimed in claim 1 wherein said dielectric member is composed of a poly-tetrafluoroethylene.

3. Apparatus according to claim 1 including a said dielectric member disposed adjacent to, and spaced apart from, each axial side of each insulating spacer.

4. Apparatus according to claim 1 including a pair of said dielectric members disposed adjacent to each axial side of each insulating spacer, each dielectric member being spaced apart from its adjacent insulating spacer and each other dielectric member.

5. Vertically disposed gas-insulated electrical apparatus, comprising:
   a vertically disposed high voltage electric conductor;
   a vertically disposed grounded cylindrical metallic housing filled with an insulating gas high in dielectric strength;
   a disc-shaped electrically insulating spacer disposed in said metallic housing and supporting said high voltage electric conductor in said housing;
   a separate first dielectric member disposed on said conductor vertically higher than said insulating spacer, said first dielectric member being disposed adjacent to and spaced apart from said insulating spacer, said first dielectric member extending radially outwardly toward, and spaced apart from, said housing; and
   a hollow separate second dielectric member having an inner and outer diameter disposed adjacent to, and spaced apart from, said insulating spacer and said first dielectric member, said second dielectric member being disposed vertically higher than said insulating spacer with said second dielectric member outer diameter contacting said housing, said second dielectric member having an axial width at said outer diameter less than the axial width of said second dielectric member at said inner diameter, said second dielectric member being spaced apart from said conductor.

6. Apparatus according to claim 5 wherein said second dielectric member is disposed vertically higher than said first dielectric member.

7. Apparatus according to claim 5 wherein said first dielectric member has an inner diameter, an outer diameter, and a variable axial width, said first dielectric member inner diameter contacting said conductor, said first dielectric member axial width at said inner diameter being less than said first dielectric member axial width at said outer diameter.

* * * * *